UNITED STATES PATENT OFFICE.

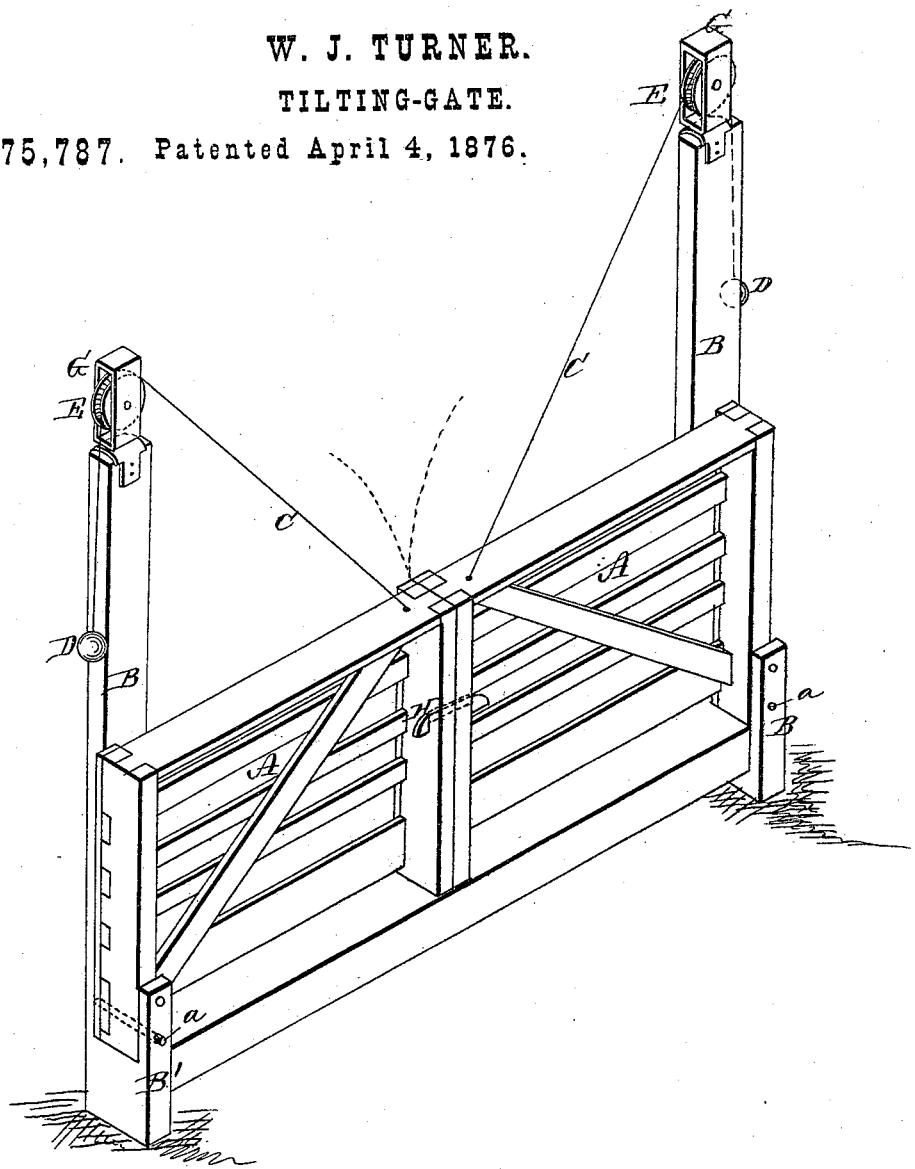

WILLIAM J. TURNER, OF BATTLE CREEK, MICHIGAN.

IMPROVEMENT IN TILTING GATES.

Specification forming part of Letters Patent No. 175,787, dated April 4, 1876; application filed April 23, 1875.

*To all whom it may concern:*

Be it known that I, WILLIAM J. TURNER, of Battle Creek, in the county of Calhoun and in the State of Michigan, have invented certain new and useful Improvements in Farm-Gates; and do hereby declare that the following is a full, clear, and exact description thereof, reference being had to the accompanying drawings, and to the letters of reference marked thereon, making a part of this specification.

The nature of my invention consists in the construction and arrangement of a farm-gate, as will be hereinafter more fully set forth.

In order to enable others skilled in the art to which my invention appertains to make and use the same, I will now proceed to describe its construction and operation, referring to the annexed drawing, which represents a perspective view of my improved gate.

The gate proper is made in two parts, A A, meeting together in the center, and the outer end of each half pivoted near its lower end by a rod, a, between an elongated post, B, and a short post, B'. From near the top of the inner end of each half A extends a rope, C, up over a pulley, E, mounted on top of the post B, and having a counterbalancing weight, D, attached to its other end. H is a latch-bar for fastening the two parts of the gate when closed. The gate may be constructed of any ordinary fence-boards, or in any manner, according to the kind of lumber at hand or the taste and design of the maker.

It will be noticed that neither part of the gate will open farther than to bring a diagonal line in a vertical position, unless it is forced by hand. The frame G, in which the pulley E is mounted, is swiveled, and will turn so as to allow the gate to be opened fully, if desired. This arrangement will prevent the slamming of the gate, which will, in the gates now in use, soon break it, and render repairs necessary.

Either one or both of the parts of the gate may be opened, as required, and both parts or either part may be raised to allow small animals to pass through by placing the pivot $a$ in different holes in the posts B B'.

Having thus fully described my invention, what I claim as new, and desire to secure by Letters Patent, is—

The swiveled frame G, provided with the pulley E, arranged upon the top of the post B', in combination with the gate A, adjustably pivoted at its lower outer end for vertical rotation, the cord C, and weight D, all substantially as set forth.

In testimony that I claim the foregoing I have hereunto set my hand this 29th day of March, 1875.

WM. J. TURNER.

Witnesses:
 W. S. DAY,
 HENRY A. CHADEAYNE.